US009475530B1

(12) United States Patent
Moyer

(10) Patent No.: US 9,475,530 B1
(45) Date of Patent: Oct. 25, 2016

(54) SWIVELING, SINGLE REAR WHEEL FOR A TRAILER

(71) Applicant: Larry Moyer, Dallas, NC (US)

(72) Inventor: Larry Moyer, Dallas, NC (US)

( * ) Notice: Subject to any disclaimer, the term of this patent is extended or adjusted under 35 U.S.C. 154(b) by 0 days.

(21) Appl. No.: 14/854,164

(22) Filed: Sep. 15, 2015

(51) Int. Cl.
B62D 63/08 (2006.01)
B62D 63/06 (2006.01)

(52) U.S. Cl.
CPC ..................... B62D 63/08 (2013.01)

(58) Field of Classification Search
None
See application file for complete search history.

(56) References Cited

U.S. PATENT DOCUMENTS

| | | | | |
|---|---|---|---|---|
| 2,568,261 A * | 9/1951 | Stade | ................ | B62D 53/0857 16/44 |
| 3,715,132 A * | 2/1973 | Denny | ..................... | B60D 1/66 267/273 |
| 4,078,821 A * | 3/1978 | Kitterman | ................ | B60P 3/07 280/401 |
| 4,305,602 A * | 12/1981 | Ungvari | ................ | B60G 11/08 280/414.1 |
| 4,372,569 A * | 2/1983 | Otterson | ............. | B62D 63/067 16/44 |
| 4,645,230 A | 2/1987 | Hammons | | |
| 5,397,148 A * | 3/1995 | Nelson | ................ | B62D 63/065 280/416.1 |
| RE37,492 E | 1/2002 | Shoquist | | |
| 6,659,491 B2 * | 12/2003 | Green | ................ | B62D 63/065 280/423.1 |
| 7,387,308 B2 | 6/2008 | Williamson | | |
| 7,543,842 B1 | 6/2009 | Fiorini | | |
| 7,832,745 B2 | 11/2010 | Rauch, Jr. | | |
| 7,992,887 B2 | 8/2011 | Cotnoir | | |

* cited by examiner

Primary Examiner — Tony Winner
(74) Attorney, Agent, or Firm — Kyle A. Fletcher, Esq.

(57) ABSTRACT

The swiveling, single rear wheel for a trailer is adapted for use with a trailer. The single rear wheel includes a mount plate that is adapted to be positioned on a bottom surface of the trailer. A coil spring is positioned between the mount plate and a distal end of a torsion bar. The distal end of the torsion bar is affixed to a plate. The plate includes a tapered ring on a bottom surface that a roller assembly engages. A pivoting shaft is rotatably engaged on the bottom surface of the plate, and is affixed to a swivel wheel. The swivel wheel is also attached to the roller assembly. The swivel wheel is able to rotate via the pivoting shaft and the roller assembly. The universal hitch is adapted to attach between a vehicle hitch of a vehicle and a front portion of a trailer.

17 Claims, 7 Drawing Sheets

SWIVELING, SINGLE REAR WHEEL FOR A TRAILER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of trailers, more specifically, a swiveling, rear wheel for a trailer.

Towing a trailer can be a tricky endeavor when the vehicle is making a sharp turn or moving in a reverse direction. The trailer can jack-knife, which is not desirable.

What is needed and is accomplished via the system of the present application is a single rear wheel and universal hitch that work on a trailer to provide superior towing characteristics behind said vehicle.

SUMMARY OF INVENTION

The swiveling, single rear wheel for a trailer is adapted for use with a trailer. A universal hitch attaches to a front portion of the trailer, and works in concert with the single rear wheel to provide enhanced handling characteristics of the trailer when being towed behind a vehicle. The at least one single rear wheel includes a mount plate that is adapted to be positioned on a bottom surface of the trailer. A coil spring is positioned between the mount plate and a distal end of a torsion bar. The distal end of the torsion bar is affixed to a plate. The plate includes a tapered ring on a bottom surface that a roller assembly engages. A pivoting shaft is rotatably engaged on the bottom surface of the plate, and is affixed to a swivel wheel. The swivel wheel is also attached to the roller assembly. The swivel wheel is able to rotate via the pivoting shaft and the roller assembly. The universal hitch is adapted to attach between a vehicle hitch of a vehicle and a front portion of a trailer.

It is an object of the invention to provide a trailer with at least one single rear wheel that works in concert with a universal hitch to provide enhanced towing characteristics of the trailer.

A further object of the invention is for the universal hitch to linearly align the trailer with respect to the forward direction of the vehicle whilst the single rear wheel is able to rotate in order to prevent the trailer from jack-knifing behind the vehicle.

These together with additional objects, features and advantages of the swiveling, single rear wheel for a trailer will be readily apparent to those of ordinary skill in the art upon reading the following detailed description of the presently preferred, but nonetheless illustrative, embodiments when taken in conjunction with the accompanying drawings.

In this respect, before explaining the current embodiments of the swiveling, single rear wheel for a trailer in detail, it is to be understood that the swiveling, single rear wheel for a trailer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the swiveling, single rear wheel for a trailer.

It is therefore important that the claims be regarded as including such equivalent construction insofar as they do not depart from the spirit and scope of the swiveling, single rear wheel for a trailer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
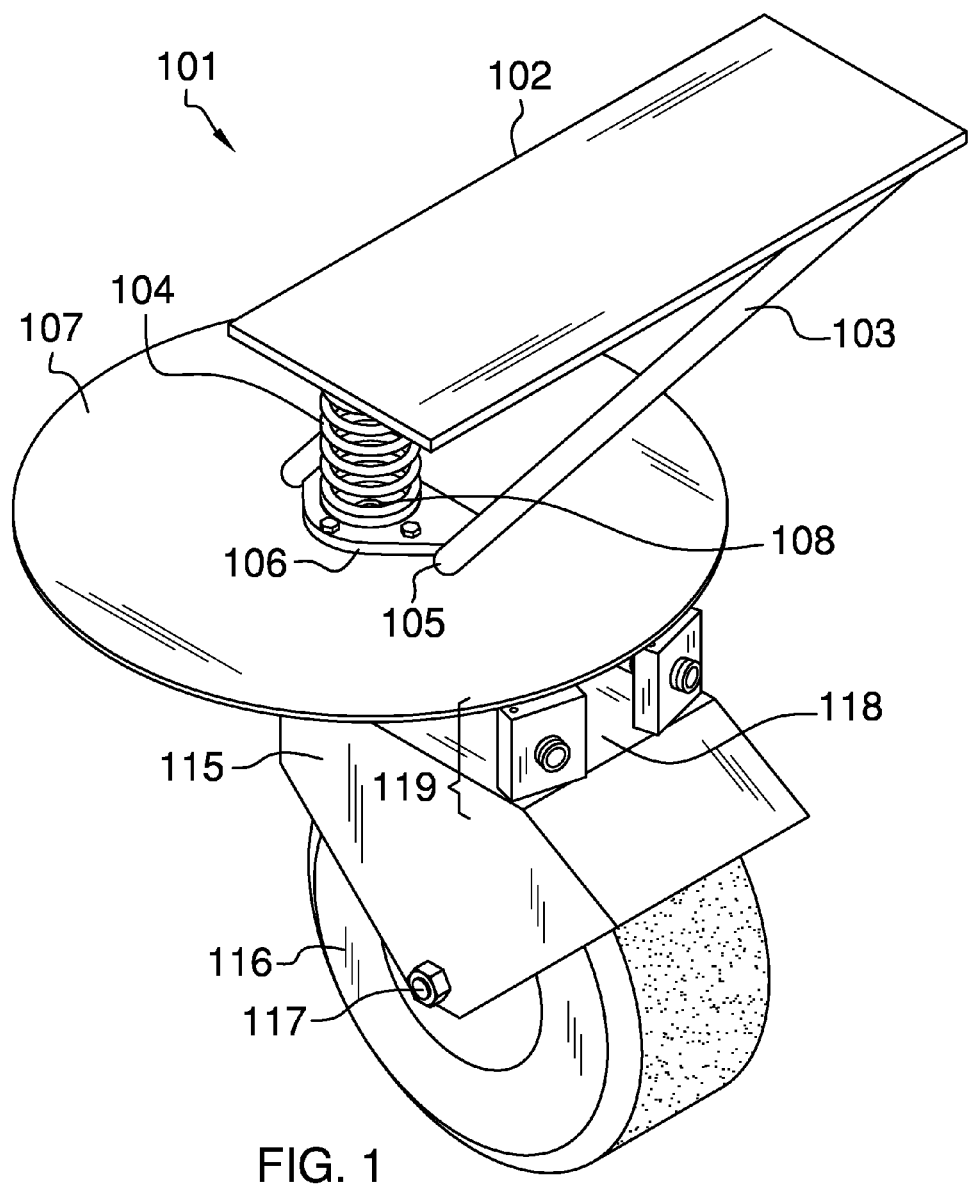
FIG. 1 is a front view of an embodiment of the disclosure.
Figure 2:
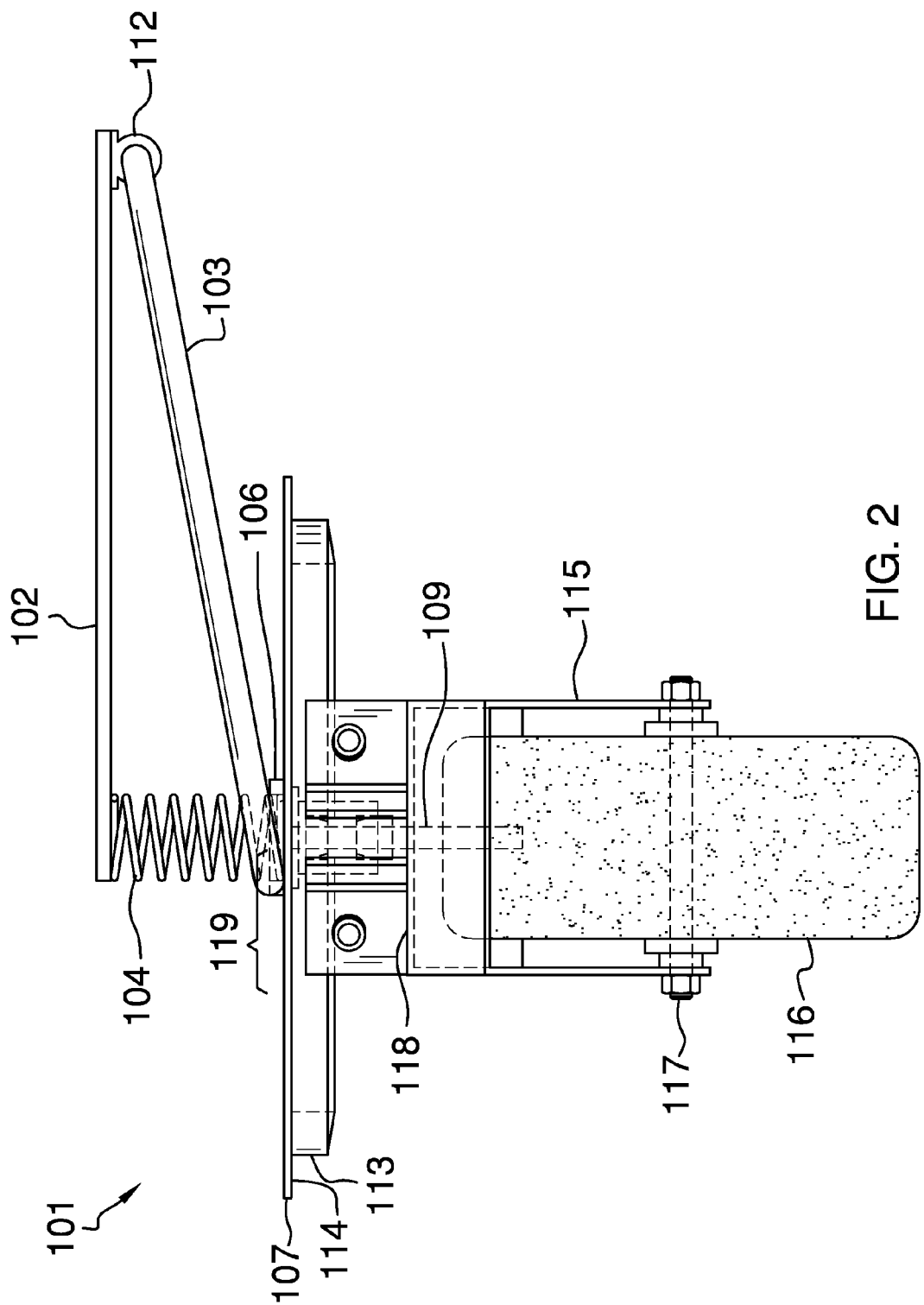
FIG. 2 is a front view of an embodiment of the disclosure.
Figure 3:
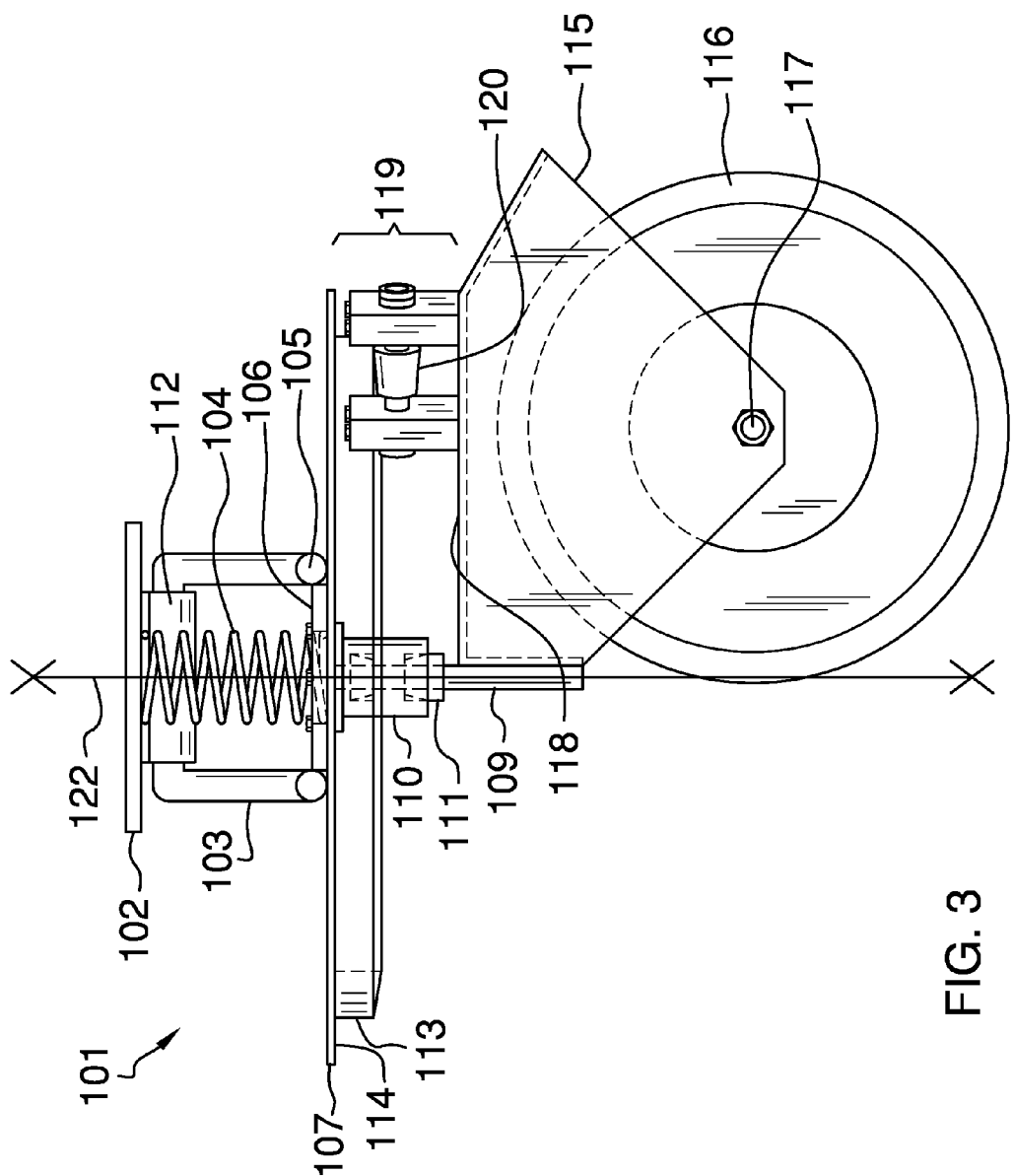
FIG. 3 is a side view of an embodiment of the disclosure.
Figure 4:
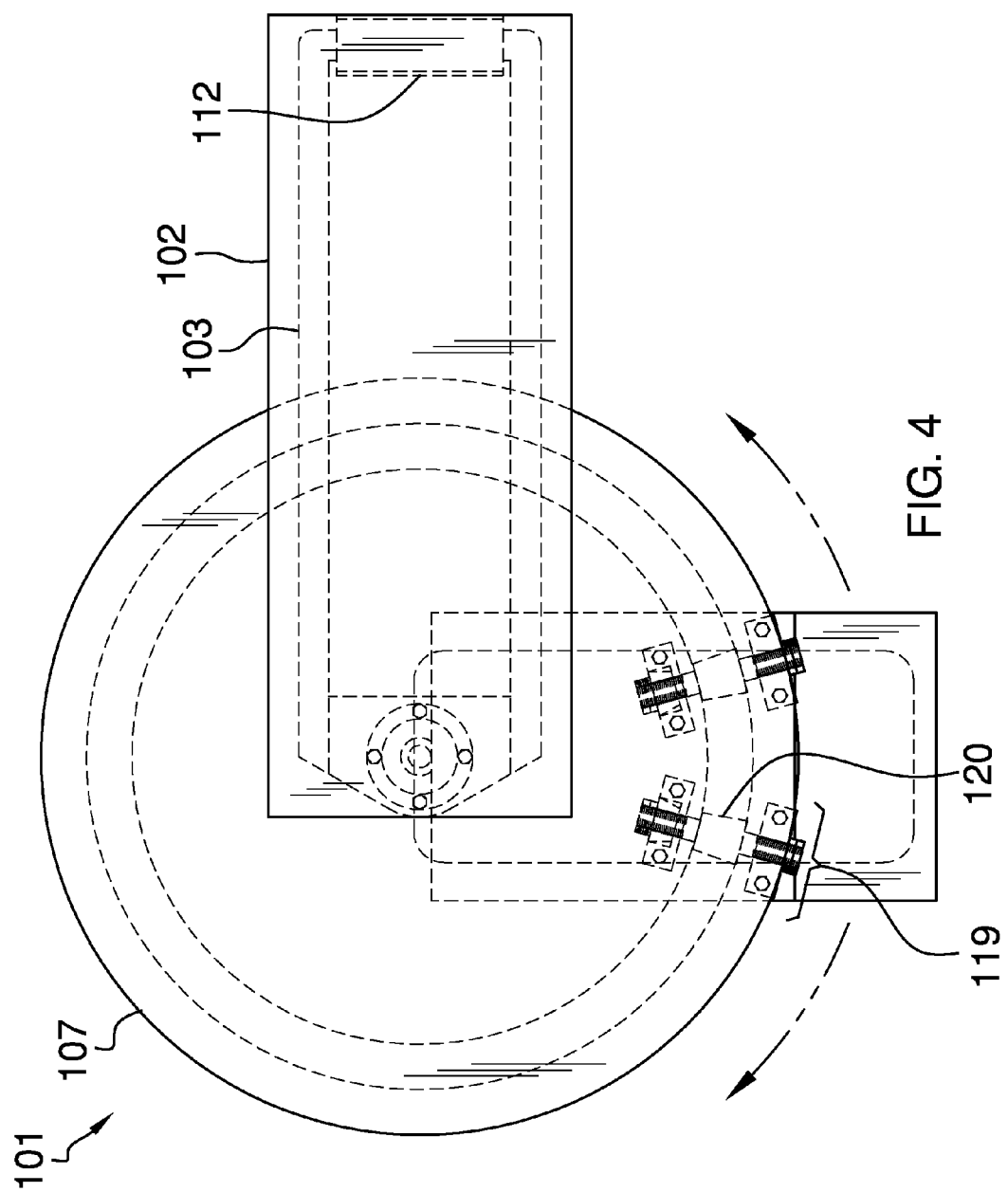
FIG. 4 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 7. The swiveling, single rear wheel for a trailer 100 (hereinafter invention) includes a single rear wheel assembly 101 and a universal hitch 201. The at least one single rear wheel assembly 101 and the universal hitch 201 are adapted for use with a trailer 300. More specifically, the universal hitch 201 is adapted to attach between the trailer 300 and a vehicle 400. The vehicle 400 is responsible for towing the trailer 300.

The at least one single rear wheel assembly 101 is adapted to be secured to a bottom surface 301 of the trailer 300. The at least one single rear wheel assembly 101 may also involve at least one of such assemblies, thereby implying a potential use of a plurality of said assemblies. The at least one single rear wheel assembly 101 is further defined with a mount plate 102 that is affixed to the bottom surface 301 of the trailer 300. The mount plate 102 is a rectangularly-shaped object that is also planar in shape. A torsion bar 103 is affixed and extends diagonally at a downward orientation from the mount plate 102. A coil spring 104 is positioned between the mount plate 102 and a distal end 105 of the torsion bar 103. The torsion bar 103 includes a spring plate 106 mounted at the distal end 105. The coil spring 104 is positioned in between the mount plate 102 and the spring plate 106.

The spring plate 106 is affixed atop of a wheel plate 107. Both the spring plate 106 and the wheel plate 107 features a rod hole 108 thereon. The wheel plate 107 is circular in shape. The rod hole 108 is concentrically aligned with the coil spring 104 such that the coil spring 104 is able to adjust the spring plate 106 up and down with respect to the mount plate 102.

The at least one single rear wheel assembly 101 includes a pivoting rod 109 that is able to pivot with respect to the wheel plate 107. A cylinder member 110 is affixed to the wheel plate 107. The pivoting rod 109 is able to pivot with respect to the cylinder member 110 via at least one bearing 111. The torsion bar 103 extends across opposing sides of the spring plate 106. Moreover, the mount plate 102 includes a torsion collar 112 that the torsion bar 103 is pivotably engaged thereby enabling the spring plate 106 to move relative the mount plate 102.

The wheel plate 107 includes a tapered ring 113 that is provided on a bottom wheel plate surface 114. The tapered ring 113 extends downwardly from the bottom wheel plate surface 114 of the wheel plate 107. The tapered ring 113 is concentrically aligned with respect to the rod hole 108 of the wheel plate 107 and the spring plate 106. The pivoting rod 109 is affixed to a wheel housing 115. The wheel housing 115 is affixed to a swivel wheel 116 via a wheel shaft 117. The wheel housing 115 is positioned atop as well as on opposing sides of the swivel wheel 116. The wheel housing 115 is further defined with an upper housing surface 118. The upper housing surface 118 is parallel with the wheel plate 107.

A roller assembly 119 is affixed to and extends upwardly from the upper housing surface 118 of the wheel housing 115. The roller assembly 119 is rotatably engaged against the tapered ring 113. The roller assembly 119 includes a roller wheel 120 that is able to role against the tapered ring 113 such that the swivel wheel 116 is able to rotate 360 degrees with respect to the wheel plate 107. It shall be noted that the at least one single rear wheel assembly 101 may utilize at least one or a plurality of the roller assembly 119 on the upper housing surface 118 of the wheel housing 115.

In use, the at least one single rear wheel assembly 101 is able to support the trailer 300 position thereon. Moreover, the at least one single rear wheel assembly 101 enables the swivel wheel 116 to rotate 360 degrees about a vertical axis 122, and with respect to the trailer 300. The universal hitch 201 is adapted to be affixed to a front surface 302 of the trailer 300. The universal hitch 201 extends forwardly from the front surface 302 of the trailer 300. The universal hitch 201 is adapted to be secured to a vehicle hitch 401 of the vehicle 400.

Figure 5:
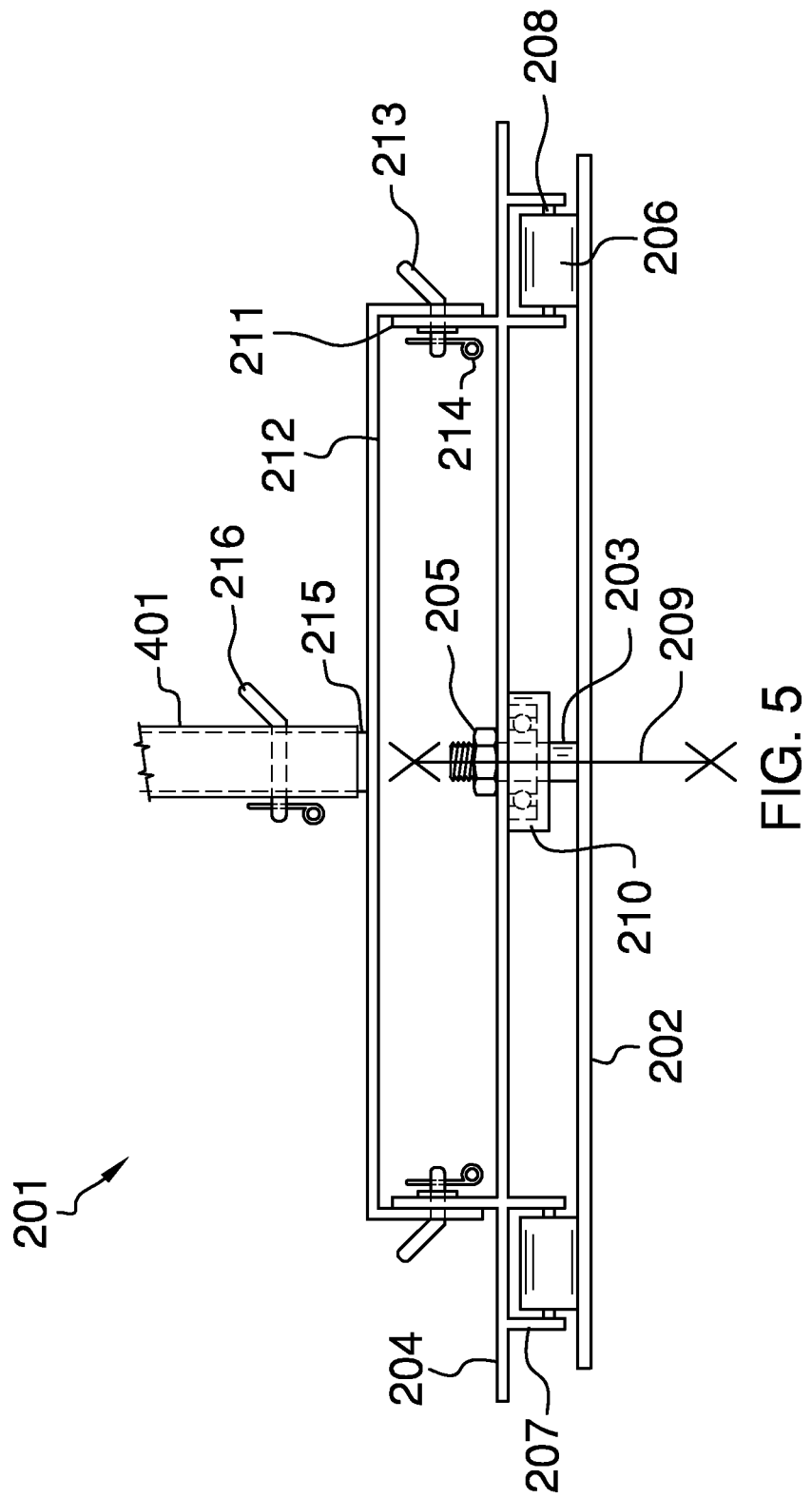
FIG. 5 is a top view of a universal hitch for the trailer that is in use with an embodiment of the disclosure.
Figure 6:
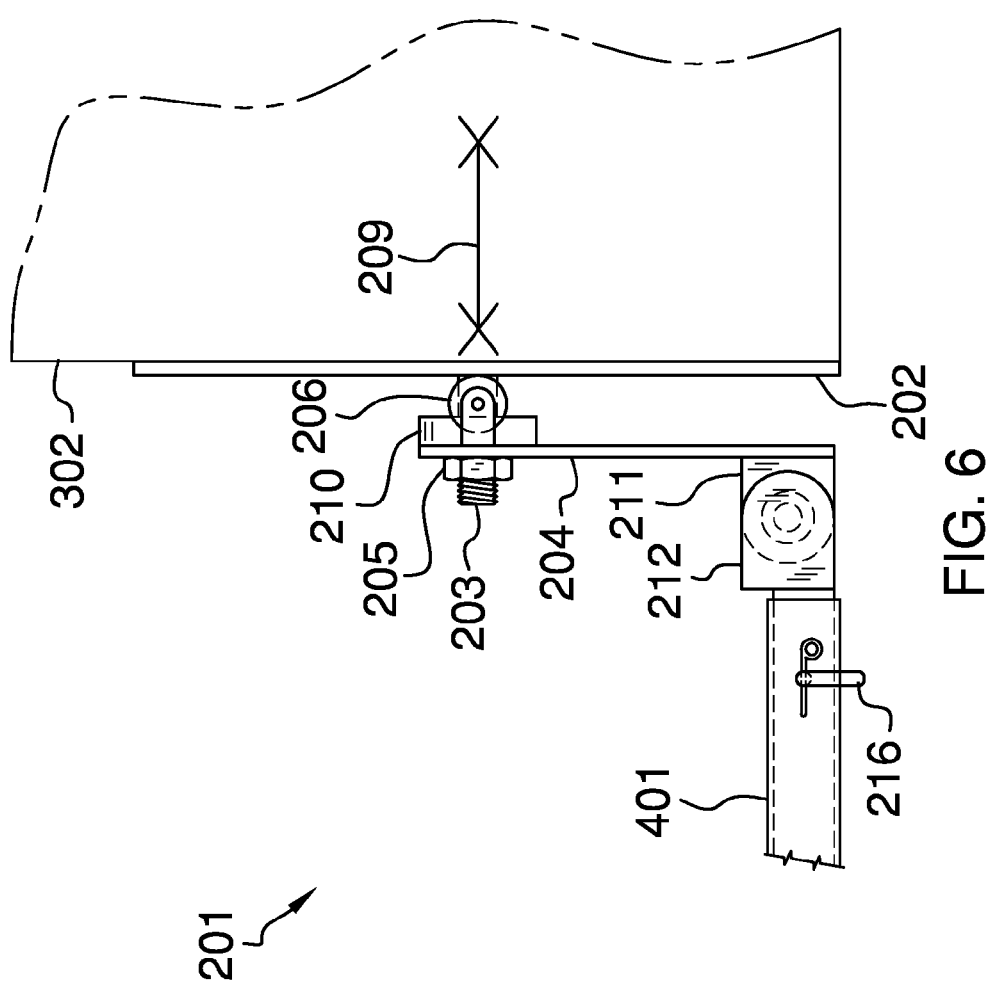
FIG. 6 is a side view of a universal hitch for the trailer that is in use with an embodiment of the disclosure.
Figure 7:
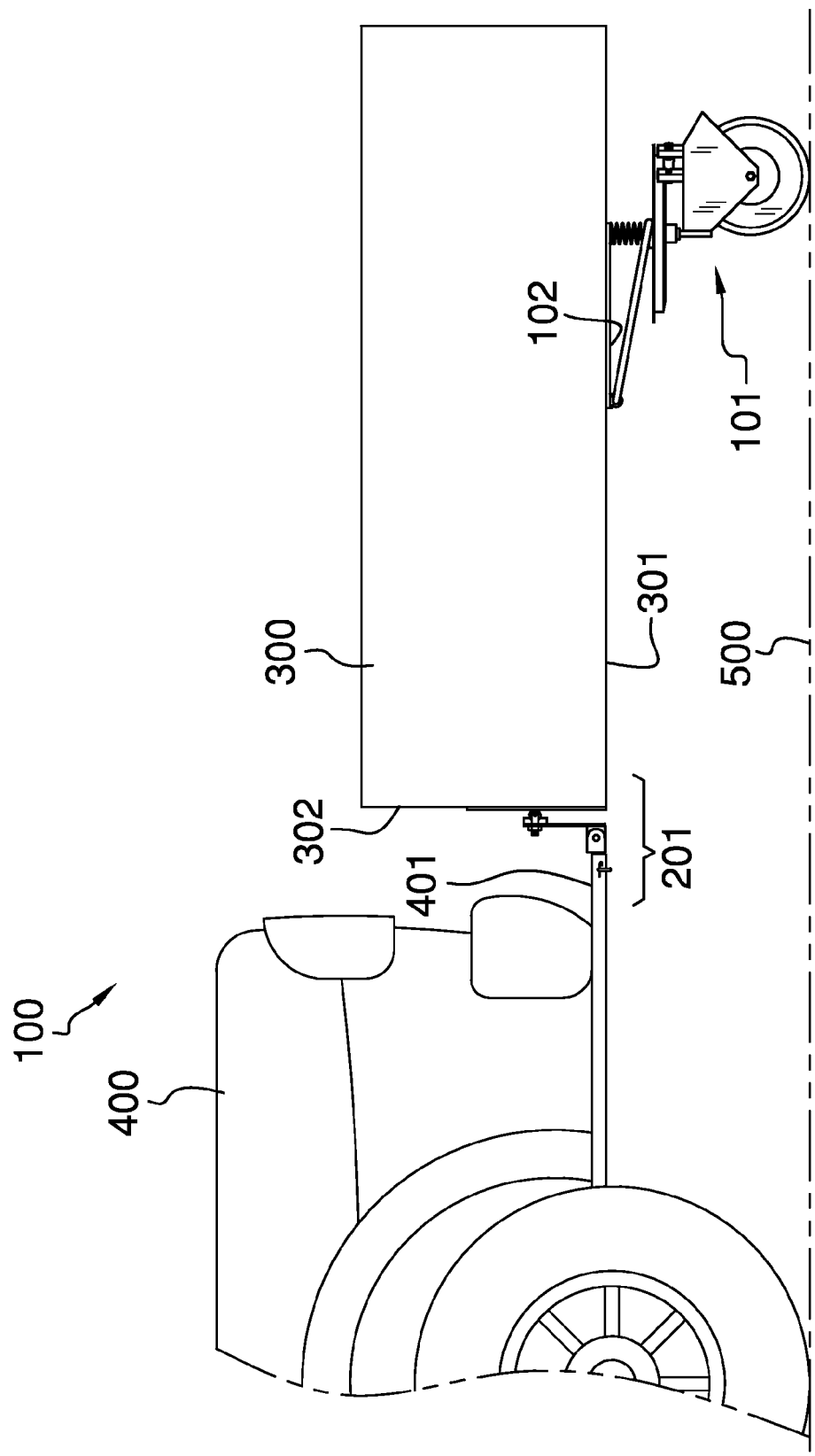
FIG. 7 is a side view of an embodiment of the disclosure in use with the universal hitch.

Referring to FIGS. 5 and 6, the universal hitch 201 is further defined to include a roller plate 202. The roller plate 202 is circular in shape as well as planar. The roller plate 202 is adapted to be rigidly affixed to the front surface 302 of the trailer 300. The roller plate 202 includes a swivel shaft 203 that is centrally aligned and extends forwardly of the trailer 300. A first hitch plate 204 is bolted to the swivel shaft 203 via a nut 205. The first hitch plate 204 is planar, and extends laterally across the roller plate 202 whereby at least one roller wheel 206 is positioned there against. The first hitch plate 204 includes roller brackets 207 that support the at least one roller wheel 206 via a roller shaft 208.

The first hitch plate 204 is able to rotate about a horizontal axis 209 via the at least one roller wheel 206. Moreover, the first hitch plate 204 includes a plate bearing 210 that is rotatably engaged with respect to the swivel shaft 203. The first hitch plate 204 includes a pair of armatures 211 that extend forwardly with respect to the trailer 300. The pair of armatures 211 attach to a second hitch plate 212 via a pivot pin 213. The pivot pin 213 is affixed to the pair of armatures 211 and the second hitch plate 212 via a cotter pin 214. The second hitch plate 212 has a hitch member 215 that is adapted to be inserted into the vehicle hitch 401 of the vehicle 400. A hitch pin 216 is used to secure the hitch member 215 to the vehicle hitch 401 of the vehicle 400.

In use, the invention 100 is adapted to connect the trailer 300 to the vehicle 400 in order for the trailer 300 to be linearly aligned behind the vehicle 400. As the vehicle 400 turns or moves in reverse the trailer 300 maintains linear alignment whilst the swivel wheel 116 of the at least one single rear wheel assembly 101 rotates as needed. Moreover, the swivel wheel 116 is adapted to rotate 360 degrees between the trailer 300 and a ground surface 500.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A swiveling, single rear wheel comprising:
at least one single rear wheel assembly that is adapted to be positioned underneath a trailer;
a universal hitch is adapted to be secured between said trailer and a vehicle such that the vehicle and the trailer maintain linear alignment whereas the at least one single rear wheel assembly is able to pivot in 360 degrees of rotational movement under said trailer and with respect to a ground surface;
wherein the at least one single rear wheel assembly is adapted to be secured to a bottom surface of the trailer;
wherein the at least one single rear wheel assembly is further defined with a mount plate that is affixed to the bottom surface of the trailer;
wherein the mount plate is a rectangularly-shaped object that is also planar in shape;
wherein a torsion bar is affixed and extends diagonally at a downward orientation from the mount plate.

2. The swiveling, single rear wheel according to claim 1 wherein a coil spring is positioned between the mount plate and a distal end of the torsion bar.

3. The swiveling, single rear wheel according to claim 2 wherein the torsion bar includes a spring plate mounted at the distal end; wherein the coil spring is positioned in between the mount plate and the spring plate.

4. The swiveling, single rear wheel according to claim 3 wherein the spring plate is affixed atop of a wheel plate; wherein both the spring plate and the wheel plate features a rod hole thereon.

5. The swiveling, single rear wheel according to claim 4 wherein the wheel plate is circular in shape; wherein the rod hole is concentrically aligned with the coil spring such that the coil spring is able to adjust the spring plate up and down with respect to the mount plate.

6. The swiveling, single rear wheel according to claim 5 wherein the at least one single rear wheel assembly includes a pivoting rod that is able to pivot with respect to the wheel plate; wherein a cylinder member is affixed to the wheel plate; wherein the pivoting rod is able to pivot with respect to the cylinder member via at least one bearing.

7. The swiveling, single rear wheel according to claim 6 wherein the torsion bar extends across opposing sides of the spring plate.

8. The swiveling, single rear wheel according to claim 7 wherein the mount plate includes a torsion collar that the torsion bar is pivotably engaged thereby enabling the spring plate to move relative the mount plate.

9. The swiveling, single rear wheel according to claim 8 wherein the wheel plate includes a tapered ring that is provided on a bottom wheel plate surface; wherein the tapered ring extends downwardly from the bottom wheel plate surface of the wheel plate; wherein the tapered ring is concentrically aligned with respect to the rod hole of the wheel plate and the spring plate.

10. The swiveling, single rear wheel according to claim 9 wherein the pivoting rod is affixed to a wheel housing; wherein the wheel housing is affixed to a swivel wheel via a wheel shaft; wherein the wheel housing is positioned atop as well as on opposing sides of the swivel wheel; wherein the at least one single rear wheel assembly enables the swivel wheel to rotate 360 degrees about a vertical axis, and with respect to the trailer.

11. The swiveling, single rear wheel according to claim 10 wherein the wheel housing is further defined with an upper housing surface; wherein the upper housing surface is parallel with the wheel plate.

12. The swiveling, single rear wheel according to claim 11 wherein a roller assembly is affixed to and extends upwardly from the upper housing surface of the wheel housing; wherein the roller assembly is rotatably engaged against the tapered ring; wherein the roller assembly includes a roller wheel that is able to role against the tapered ring such that the swivel wheel is able to rotate 360 degrees with respect to the wheel plate.

13. The swiveling, single rear wheel according to claim 12 wherein the universal hitch is adapted to be affixed to a front surface of the trailer; wherein the universal hitch extends forwardly from the front surface of the trailer; wherein the universal hitch is adapted to be secured to a vehicle hitch of the vehicle.

14. The swiveling, single rear wheel according to claim 13 wherein the universal hitch is further defined to include a roller plate; wherein the roller plate is circular in shape as well as planar; wherein the roller plate is adapted to be rigidly affixed to the front surface of the trailer; wherein the roller plate includes a swivel shaft that is centrally aligned and extends forwardly of the trailer.

15. The swiveling, single rear wheel according to claim 14 wherein a first hitch plate is bolted to the swivel shaft via a nut; wherein the first hitch plate is planar, and extends laterally across the roller plate whereby at least one roller wheel is positioned there against; wherein the first hitch plate includes roller brackets that support the at least one roller wheel via a roller shaft.

16. The swiveling, single rear wheel according to claim 15 wherein the first hitch plate is able to rotate about a horizontal axis via the at least one roller wheel; wherein the first hitch plate includes a plate bearing that is rotatably engaged with respect to the swivel shaft; wherein the first hitch plate includes a pair of armatures that extend forwardly with respect to the trailer; wherein the pair of armatures attach to a second hitch plate via a pivot pin.

17. The swiveling, single rear wheel according to claim 16 wherein the pivot pin is affixed to the pair of armatures and the second hitch plate via a cotter pin; wherein the second hitch plate has a hitch member that is adapted to be inserted into the vehicle hitch of the vehicle; wherein a hitch pin is used to secure the hitch member to the vehicle hitch of the vehicle.

* * * * *